US008230352B2

(12) United States Patent
Gaillard et al.

(10) Patent No.: US 8,230,352 B2
(45) Date of Patent: Jul. 24, 2012

(54) COLLABORATION INTERFACE FOR A MULTI-CHANNEL COLLABORATION WINDOW WITH CONTEXT SUPPORT

(75) Inventors: Jean Francois Gaillard, La Colle sur Loup (FR); Andreas Kresse, Cagnes sur Mer (FR); Christophe Aubert, Valbonne (FR)

(73) Assignee: SAP AG, Walldorf (DE)

( * ) Notice: Subject to any disclaimer, the term of this patent is extended or adjusted under 35 U.S.C. 154(b) by 754 days.

(21) Appl. No.: 12/338,554

(22) Filed: Dec. 18, 2008

(65) Prior Publication Data

US 2010/0162131 A1 Jun. 24, 2010

(51) Int. Cl.
G06F 3/00 (2006.01)

(52) U.S. Cl. ........ 715/753; 715/751; 715/716; 709/224; 709/204; 345/751

(58) Field of Classification Search .......... 715/751, 715/744, 746, 759, 804; 709/224; 345/330; 395/200; 379/202
See application file for complete search history.

(56) References Cited

U.S. PATENT DOCUMENTS

| 5,758,079 A * | 5/1998 | Ludwig et al. ............. 709/204 |
| 2002/0075304 A1* | 6/2002 | Thompson et al. ........ 345/751 |
| 2006/0041616 A1* | 2/2006 | Ludwig et al. ............. 709/204 |
| 2006/0080432 A1* | 4/2006 | Spataro et al. ............ 709/224 |
| 2009/0019367 A1* | 1/2009 | Cavagnari et al. ......... 715/716 |

* cited by examiner

*Primary Examiner* — Tuyetlien Tran
*Assistant Examiner* — Abimbola Ayeni
(74) *Attorney, Agent, or Firm* — Brake Hughes Bellermann LLP

(57) ABSTRACT

A collaboration window may provide a graphical user interface to a user for facilitating communication over at least one of a plurality of communication channels while providing data relevant to the communication and available from a backend application. A collaboration engine may be configured to generate the collaboration window including the graphical user interface, and configured to provide and receive information therewith regarding the communication. A collaboration manager may be configured to communicate, in accordance with a common collaboration interface, with each of a plurality of collaboration components, each collaboration component associated with at least one communication channel. The collaboration manager may include a component selector configured to select a selected collaboration component from among the plurality of collaboration components, the selected collaboration component associated with a communication channel for executing the communication, and a plurality of component managers, each associated with a corresponding one of the plurality of collaboration components and configured to communicate therewith using the common collaboration interface, wherein a selected component manager corresponding to the selected collaboration component is configured to relay information between the selected collaboration component and the collaboration engine to thereby execute the communication using the collaboration window.

16 Claims, 13 Drawing Sheets

COLLABORATION INTERFACE FOR A MULTI-CHANNEL COLLABORATION WINDOW WITH CONTEXT SUPPORT

TECHNICAL FIELD

This description relates to integration of communication channels with respect to a graphical user interface.

BACKGROUND

Current technology provides many options for people to communicate with one another. For example, people may use telephones (including hardware telephones and/or 'soft phones' running on a computer), email applications, chat or instant messaging applications, videophones, webcams, or any other known or not-yet-known techniques for communication.

In day-to-day life, people may wish to implement many of these communication mediums or channels using, or in conjunction with, their local computing device(s). For example, a salesperson at an office desk may use a personal computer to access and utilize customer records or other work-related information, and, in so doing, may use a telephone and/or email application to communicate with the customer and/or other salespersons regarding past or potential sales.

Efforts have been made to provide integration of one or more available communication devices/channels, with one another and/or with software running on the computing device(s). For example, techniques exist for allowing users to place and conduct a telephone call from within an application, such as within a web browser or other desktop application.

In many such cases, however, it may occur that the provider of the software application (e.g., a business application such as a Customer Resource Management (CRM) application) may be unwilling or unable to provide desired communication functionality, while provider(s) of the communication channels (e.g., telephone hardware or service provider) may not have necessary expertise in providing communication functionality that is compatible with the software application. As a result, it may occur that it is difficult for either the software provider or the communications provider to provide the level of service they desire, so that the user(s) of such systems may not experience a full benefit of integration of the communications channels with one another and with the software (e.g., business) application.

SUMMARY

According to one general aspect, a computer system may provide a collaboration window providing a graphical user interface to a user for facilitating communication over at least one of a plurality of communication channels while providing data relevant to the communication and available from a backend application. A collaboration engine may be configured to generate the collaboration window including the graphical user interface, and configured to provide and receive information therewith regarding the communication. A collaboration manager may be configured to communicate, in accordance with a common collaboration interface, with each of a plurality of collaboration components, each collaboration component associated with at least one communication channel. The collaboration manager may include a component selector configured to select a selected collaboration component from among the plurality of collaboration components, the selected collaboration component associated with a communication channel for executing the communication, and a plurality of component managers, each associated with a corresponding one of the plurality of collaboration components and configured to communicate therewith using the common collaboration interface, wherein a selected component manager corresponding to the selected collaboration component is configured to relay information between the selected collaboration component and the collaboration engine to thereby execute the communication using the collaboration window.

According to another general aspect, a computer program product may be provided for enabling a collaboration window providing a graphical user interface to a user for facilitating communication over at least one of a plurality of communication channels while providing data relevant to the communication and available from a backend application, the computer program product being tangibly embodied on a computer-readable medium and including executable code that, when executed, is configured to operate at least one data processing apparatus in accordance therewith. The computer program product may include a collaboration component configured to implement a common collaboration interface with a component manager associated with the collaboration window, to thereby implement at least one of the plurality of communication channels by relaying the communication between the component manager and a server implementing the channel. The collaboration component may include a lifecycle manager configured to receive commands from the component manager using the common collaboration interface and to configure a state of the collaboration component based thereon, a connector configured to communicate with the backend application using the common collaboration interface and to provide the data therefrom that is relevant to the communication in conjunction with the communication, and a channel manager configured to exchange the communication with the component manager using the common collaboration interface, and configured to exchange the communication with the server implementing the channel.

According to another general aspect, a method of supplementing a collaboration window providing a graphical user interface to a user for facilitating communication over at least one of a plurality of communication channels while providing data relevant to the communication and available from a backend application, may include generating the collaboration window including the graphical user interface, and configured to provide and receive information therewith regarding the communication, receiving a request, via the collaboration window, to execute the communication over a communication channel of the plurality of channels, selecting a selected collaboration component from among the plurality of collaboration components, based on the request, the selected collaboration component associated with the communication channel for executing the communication, selecting a component manager corresponding to the selected collaboration component from among a plurality of component managers, the component manager being configured to communicate with the selected collaboration component by way of a common collaboration interface that is associated with each of the plurality of component managers and the plurality of collaboration components, and exchanging information between the collaboration window and a server implementing the communication channel, using the component manager, the common collaboration interface, and the collaboration component.

The details of one or more implementations are set forth in the accompanying drawings and the description below. Other features will be apparent from the description and drawings, and from the claims.

DETAILED DESCRIPTION

Figure 1:
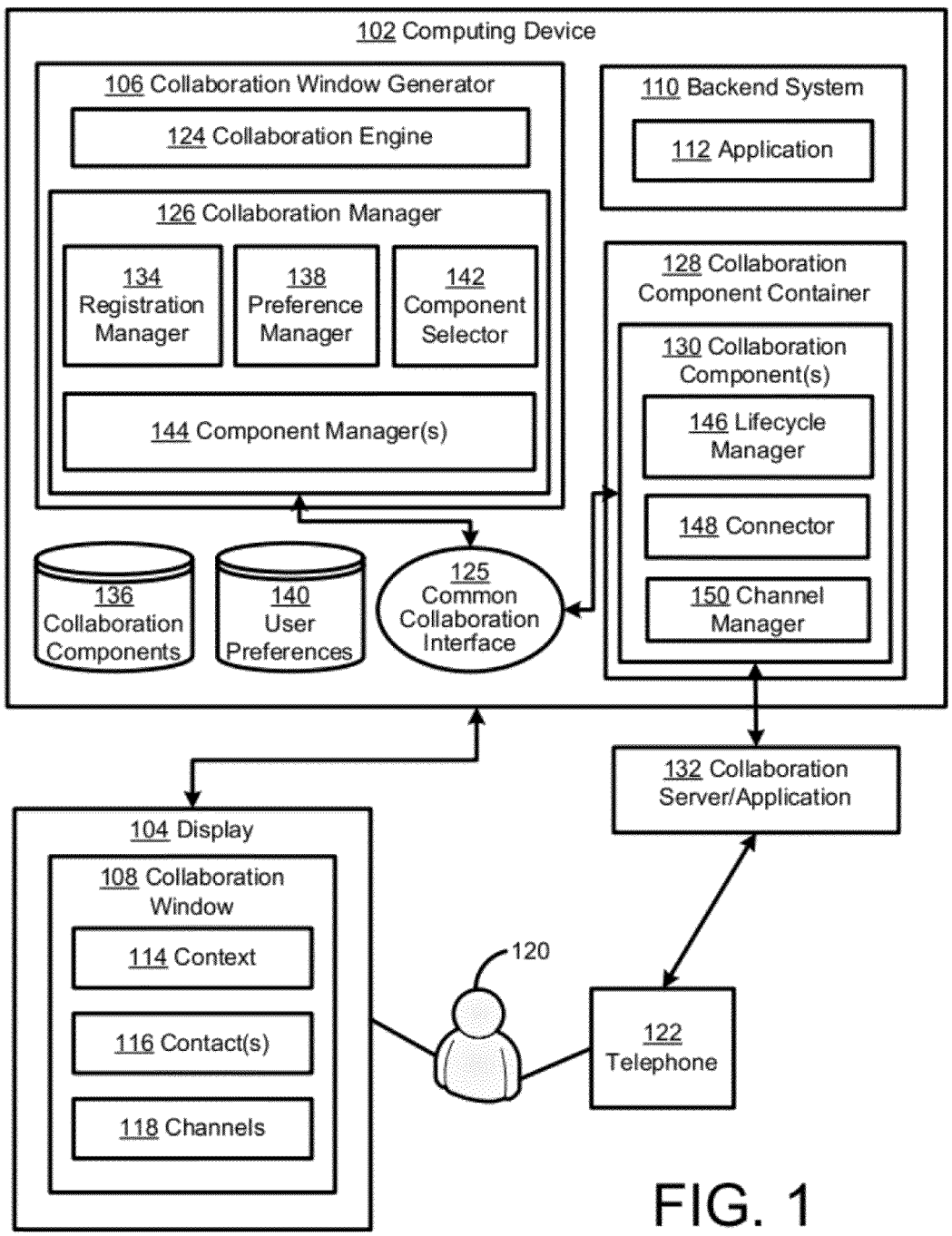
FIG. 1 is a block diagram of a system implementing a collaboration interface for a multi-channel collaboration window with context support.

FIG. 1 is a block diagram of a system 100 implementing a collaboration interface for a multi-channel collaboration window with context support. In the example of FIG. 1, the system 100 allows software providers (e.g., business software providers) and communication providers to collaborate with one another while specializing in their own areas of expertise. In this way, users may be provided with desired software functionality from a desired software vendor, without sacrificing a desired level or type of communication to do so. Moreover, users may be provided with a full benefit of interoperability of the software with the communication channel(s) (e.g., including or associating relevant business data with a current communication, such as a telephone call).

In FIG. 1, a computing device 102 represents virtually any computing device (e.g., laptop computer or desktop computer) having at least the standard associated elements, such as, for example, a processor, memory, and associated input/output devices (not shown in FIG. 1 for sake of conciseness). Further, the computing device 102 may represent more than one computing device, such as may be connected by a network of some sort. The computing device 102 may be associated with a display 104, which may represent a liquid crystal display (LCD) or virtually any other suitable type of display.

The computing device 102 may implement a collaboration window generator 106 that may be configured to generate a collaboration window 108 on the display 104. As described in more detail below, the collaboration window generator 106 may, in some implementations, be local to the computing device 102. Moreover, a backend system 110 running an application 112 also may be executed locally to the computing device 102 and/or may be executed remotely in whole or in part. For example, the backend system 110 may represent a vendor-specific suite of, e.g., business applications, including the application 112 (e.g., a CRM application).

The collaboration window 108 may include a number of functionalities that are related, for example, to allowing users to participate in communication(s) with other users. For example, the collaboration window 108 may include context information 114 related to the application 112, where the context information 114 may be useful in conducting the communication. For example, as already referenced, where the backend system 110 includes business software, the application 112 may represent a Customer Relationship Management (CRM). In such examples, the context information 114 may include information regarding past, current, or future (potential) sales to each customer, or may relate to customer support. Similar examples exist in other business areas, such as Supplier Relationship Management (SRM). Contact information 116 may include contact information for potential communication partners (e.g., for customers or potential customers in the CRM example, above). Channels 118, as described in detail below, may refer generally to channels of communication such as telephone, email, chat, or instant messaging. That is, the channels window/icon 118 of FIG. 1 may represent a menu, list, or other selection technique whereby a user 120 may select a desired type of communication.

Although it is apparent from the present description that such channels of communication may include many different types or examples, the present description primarily provides detail(s) regarding the example communication channel of telephony. However, it will be apparent that corresponding examples and techniques may be implemented for other communication channels.

In the example of FIG. 1, it may occur that the user 120 is a salesperson at a company whose job is to pursue and complete sales to current and potential customers. Company owners or other decision-makers may have invested (or may wish to invest) in a certain brand or type of telephone 122 (or other communication hardware/software). Further, however, the company owners or other decision-makers may wish to invest in the backend system 110 and associated application(s) 112, e.g., to increase an efficacy of the user 120 in completing sales by providing the user with access to a CRM application (e.g., application 112) that is made and sold by a particular software vendor.

In practice, however, it may occur that the software vendor producing the application 112 may have little or no expertise in providing (access to) communication channels, or simply may not desire to do so. Conversely, it may occur that a maker of the telephone 122 may have little or no knowledge of the application 112 or how to interact with it in a manner that is most advantageous to the user 120.

The system 100 of FIG. 1 solves at least the above problems by providing techniques whereby the maker of the application 112 and the maker of the telephone 122 may interact in order to provide the user 120 with a desired level and type of services and features. More specifically, as described herein, the system 100 allows, e.g., the maker of the telephone 122 and/or other channel providers, to implement communication between the user 120 (via the collaboration window 108) by way of a number of different types of communication channels. Moreover, as described herein, the communication may be enriched with information related to the application 112 (as shown, e.g., by the context information 114). For example, when conducting a telephone call by way of the collaboration window 108, the user 120 may automatically be provided with information about the relevant customer(s), past purchases, open deals, or other information that may assist a productivity and efficiency of the user 120 in completing a sale(s).

In more detail, and as shown in FIG. 1, the collaboration window generator 106 may include a collaboration engine 124 that provides more-or-less conventional functions, except as otherwise noted herein. For example, the collaboration engine 124 may be responsible for handling incoming requests from the user 120 (e.g., selection of a communication channel) and for providing outgoing notifications to the user 120 (e.g., information about the context 114 and/or the contacts 116) by way of an appropriate graphical user interface (GUI).

Meanwhile, the collaboration window generator 106 may include a collaboration manager 126, which may communicate by way of a common collaboration interface 125 (e.g., application program interface or API) with a plurality of collaboration components 130 that may be provided by third-party providers (e.g., provided by makers of the telephone 122). By providing a technique(s) by which the telephone 122 may interact with the collaboration window 108 to provide one of a plurality of communication channels (i.e., telephony), one or both of the software vendor and the telephone maker may benefit (e.g., due to increased purchasing of the application 112 and/or of the telephone 122, respectively, and due to increased customer satisfaction with both).

Specifically, a collaboration component container 128 may be provided as a separate environment (e.g., a "sandbox") in which a collaboration component 130 may be implemented. The collaboration component 130 may be an add-on component provided by a $3^{rd}$ party provider (e.g., the maker of the telephone 122) that is compatible with the common collaboration interface 125, which is itself also compatible with the collaboration manager 126. Consequently, the collaboration component 130 may relay, and thereby implement, communications between the collaboration manager 126 and a corresponding collaboration server or application 132 (e.g., here, a telephone server that is implemented by, or in communication with, the telephone 122).

More generally, a number of $3^{rd}$ party providers of communication channels may each implement their own collaboration component(s) 130, each of which may be associated with one or more communication channels (e.g., telephone, e-mail, chat, or instant messaging) and which may be registered at installation with the collaboration manager 126 using a registration manager 134. The collaboration components themselves (or references thereto) may be stored in a store 136. Then, during operation, the component manager accesses a preference manager 138 to implement user preferences 140 or other criteria as described herein to inform a component selector 142 as to whether and how to select from among the collaboration component(s) 130 from the storage 136.

For example, during operation, the user 120 may log onto the collaboration window 108, including logging into the application 112 in order to obtain/implement/access the context information 114 and/or the contact information 116, as described herein. The user 120 may view the contacts 116 and select a potential recipient for a telephone call, and may implement the call using the collaboration window 108 (specific examples of such operations are shown and described herein, e.g., with respect to FIG. 3).

The preference manager 138 may determine a user preference, such as a preference for one $3^{rd}$ party provider or another, for implementing certain communications over available or desired channels. For example, there may be two or more collaboration component(s) 130, each provided by a corresponding $3^{rd}$ party telephony provider and registered with the registration manager 134. Then, an explicit selection of one or the other by the user 120, or some other preference criteria, may be used to allow the component selector 142 to select an appropriate and desired collaboration component(s) 130.

Consequently, a component manager(s) 144 (which also may be considered to be a collaboration channel manager) may be implemented by the collaboration window generator 106 which is responsible for communicating with its corresponding collaboration component(s). That is, for example, there may be component manager(s) and corresponding collaboration component(s) for each available communication channel.

The collaboration component(s) 130 may have a number of standard elements, as illustrated in FIG. 1 and described in more detail herein. For example, a lifecycle manager 146 may be used to start, stop, or otherwise manage an operation or state of its corresponding collaboration component. A connector 148 may be used to access or otherwise interact with the application 112. A channel manager 150 may be used to actually communicate with the collaboration server/application 132 (e.g., telephony server) and thereby implement the communication (e.g., telephone call) with the collaboration manager 126.

The system 100 of FIG. 1 thus provides the user 120 with a communication experience that is richly varied in terms of available communications channels, that is incorporated into the desktop/day-to-day experience of the user 120 by way of the collaboration window 108, and that provides integration of the communications channels and desktop experience with information (e.g., business information) of the application 112.

Figure 2:
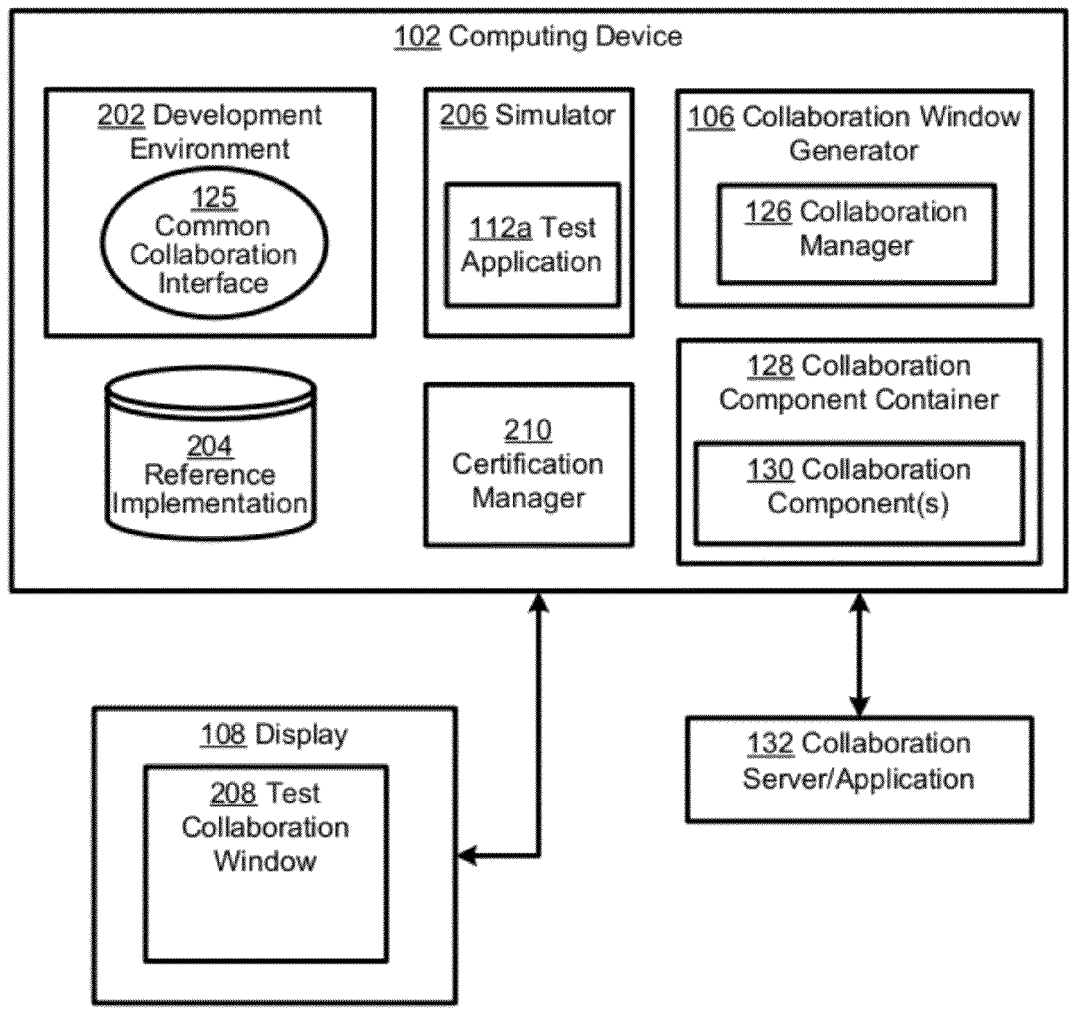
FIG. 2 is a block diagram of a system for developing collaboration components for use with the system of FIG. 1.

FIG. 2 is a block diagram of a system 200 for developing collaboration components 130 (e.g., as a development and first-testing environment) for use with the system 100 of FIG. 1. That is, as already explained, a $3^{rd}$ party provider with expertise in certain types of communication (e.g., telephony or email) may be enabled to develop and provide the collaboration component 130.

In FIG. 2, the computing device 102 is illustrated as being implemented by a developer of the collaboration component 130, e.g., by a maker of the telephone 122. Thus, it will be appreciated, as already described, that the computing device 102 may potentially represent two or more computers, including a computer where the collaboration component is developed by the $3^{rd}$ party provider/developer and/or a computer where the collaboration component 130 is actually implemented (as described above with respect to FIG. 1).

In FIG. 2, the computing device 102 may include a development environment 202. For example, where the computing device 102 is used to execute Windows-based application(s) and platform(s), the development environment 202 may include the .net framework. As shown, the common collaboration interface 125 may be developed and configured within the development environment 202, and thus may later be executed using this framework (e.g., the .Net framework) when implemented by the user 120.

More specifically, a reference implementation 204 may refer to one or more code sections related to the collaboration component(s) 130, which may be provided by a vendor or manufacturer of the software application 112, and which the $3^{rd}$ party developer may use (e.g., modify or leverage) to obtain its own collaboration component 130. Since the $3^{rd}$ party developer may not have access to the actual application 112, the system 200 may provide a simulator 206 that is configured to implement a test application 112a which provides most or all of the functions of the application 112 that might be of use or interest to the developer of the collaboration component. In FIG. 2, the simulator 206 may be implemented as a servlet running in an appropriate web container (e.g., the Apache Tomcat web container) and serving text files to requests (e.g., Hyper-text Transfer Protocol (HTTP)) issued by the collaboration window generator 106.

The computing device 102 may implement a version of the collaboration window 106 (and collaboration manager 126) that is compatible with the simulator 206. As referenced with respect to FIG. 1, a collaboration component container 128 (sandbox) may be used to provide certain safeguards, including protecting the collaboration window 106 from crashing if/when the collaboration component(s) 130 crash(es).

A test collaboration window 208 may thus be generated and the 3$^{rd}$ party developer may thus determine whether the collaboration component(s) 130 under development are suitable for implementation in the system 100 of FIG. 1. For example, the developer may simply test and evaluate the test collaboration window 130. A certification manager 210 may be used to formally evaluate a resulting collaboration component 130 and certify its compliance with the common collaboration interface 125.

Figure 3:
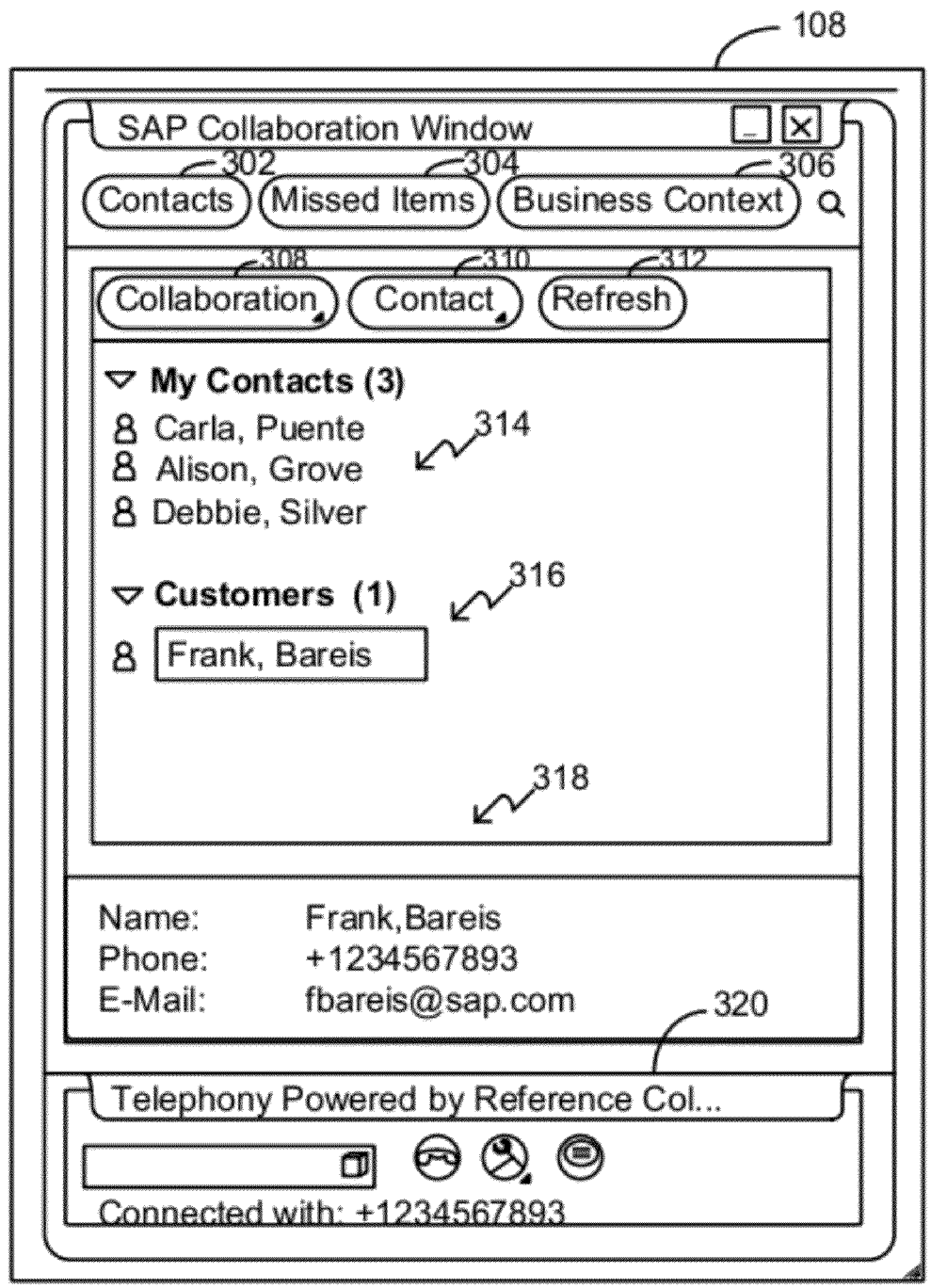
FIG. 3 is a screenshot of an example collaboration window that may be used in the examples of FIGS. 1 and 2.

FIG. 3 is a screenshot 300 of an example collaboration window that may be used in the examples of FIGS. 1 and 2. In the example of FIG. 3, the collaboration window 108 includes three selection buttons 302, 304, 306 associated with contacts, missed items, and business context, respectively. More specifically, the missed items 304 may refer to communication items such as specific phone calls or emails that were not received by the user 120. The business context 306 may refer, as referenced above, to business information from the application 112 that is associated with an incoming or outgoing communication (such as information related to a potential or pending sale to a customer).

In FIG. 3, the contacts icon 302 is selected and reveals further selections related to collaboration icon 308, contacts icon 310, and a refresh button 312. The collaboration icon 308 may be used to provide the user 120 with different options for collaborating with contacts associated with the contacts icon 310.

Specifically, as shown, contacts may be listed in portion 314 of the screenshot, while customers are listed in portion 316 of the screenshot of FIG. 3. As also illustrated, if one of the contacts (such as a customer "Frank Bareis") is selected/highlighted, then a portion 318 may be used to provide additional contact information for Frank Bareis.

Finally in FIG. 3, a portion 320 may be provided that is associated with the communication channel of telephony (e.g., based on a user selection using the collaboration icon 308 and/or selected in conjunction with the preference manager 138 of FIG. 1). Specifically, the 3$^{rd}$ party provider may be referenced, along with implementation details (e.g., the phone number being used and icons for implementing options, preferences, or features associated with the telephone call(s)).

Thus, the collaboration window 108 of FIG. 3 provides a single, convenient forum for the user 120 to communicate with partners using any of a plurality of available communication channels. For example, the user 120 may place a phone call and, in so doing and based on the input phone number, may be provided with relevant business data regarding the recipient of the phone call. Similar comments apply for incoming telephone calls, and/or for outgoing/incoming communications over other channels, such as e-mail or chat channels.

Figure 4:
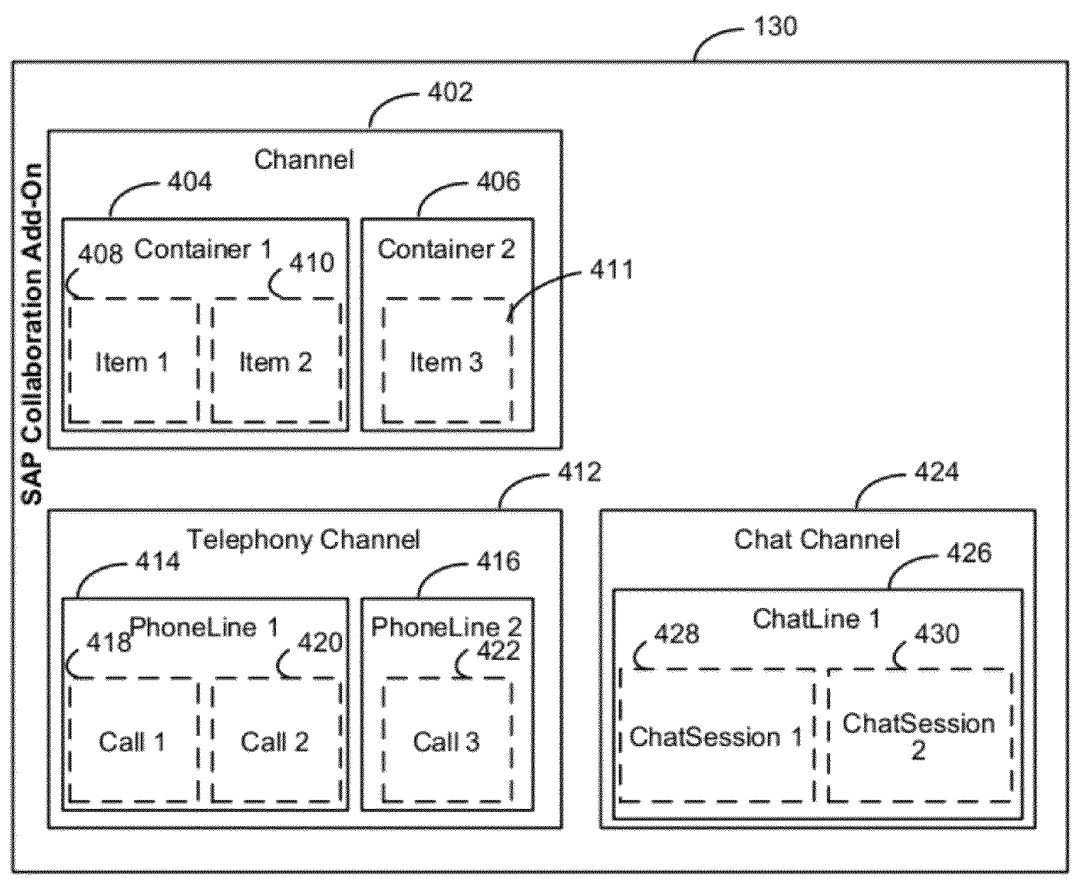
FIG. 4 is a block diagram of a channel structure that may be used in the examples of FIGS. 1-3.

FIG. 4 is a block diagram of a channel structure that may be used in the examples of FIGS. 1-3. In FIG. 4, it is illustrated in general that one or more collaboration components 130 may be implemented as add-ons for the collaboration window generator 106. Specifically, a channel 402 may include multiple containers 404 (containing items 408, 410) and 406 (containing item 411). As already referenced, the term channel in this context may refer to an overall communications channel, such as a telephone, email, chat, or instant messaging channel. Meanwhile, the term container may refer to a specific implementation of the relevant channel, and the term item may refer to an actual communication instance within the relevant container.

For example, a telephony channel 412 may include a container(s) 414, 416, such as a particular phone line, which may themselves contain items 418, 420, 422 representing specific telephone calls on one or more of the phone lines 414, 416, as shown. Similarly, a chat channel 424 may be used to implement a container 426 as a chatline in which items 428, 430 represent individual chat sessions. Similar illustrations might be made for an email channel having containers associated with one or more inbox and containing individual items (i.e., emails).

Figure 5:
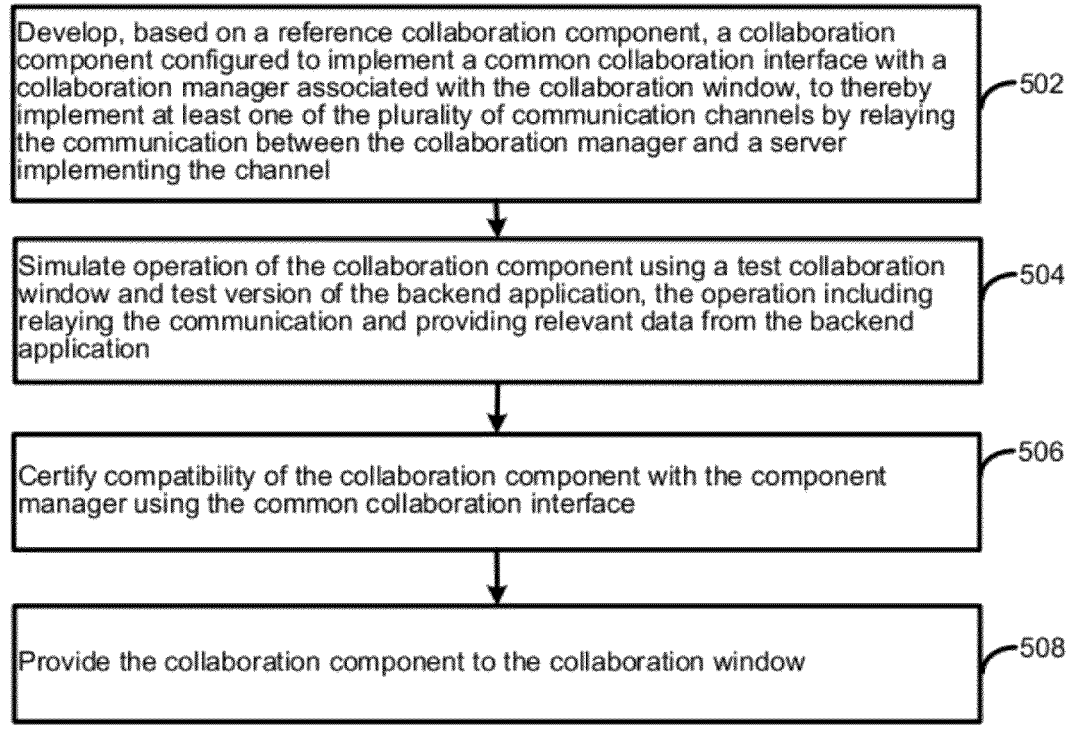
FIG. 5 is a flowchart illustrating first example operations of the system(s) of FIGS. 1 and/or 2.

FIG. 5 is a flowchart 500 illustrating example operations of the system(s) of FIGS. 1 and/or 2. FIG. 5 illustrates a method of supplementing the collaboration window 108 with the collaboration component(s) 130, e.g., 3$^{rd}$ party add-ons.

More specifically, based on a reference collaboration component, a collaboration component may be developed that is configured to implement a common collaboration interface with a collaboration manager associated with the collaboration window, to thereby implement at least one of the plurality of communication channels by relaying the communication between the collaboration manager and a server implementing the channel (502). For example, the development environment 202 may be used to develop the common collaboration interface 125, and may be used with the reference implementation 204 to develop the collaboration component(s) 130. For example, the reference implementation 204 may be an example of software/code for implementing a telephony collaboration component that may be used as a model to develop the collaboration component 130 with any modifications necessary for the implementation in question (e.g., to ensure the collaboration component 130 is compatible with the telephone 122 of FIG. 1). Then, in this example, the telephony communication channel may be implemented by virtue of the collaboration component 130 relaying the communication between the collaboration (i.e., telephony) server/application 132 and the collaboration manager 126.

Operation of the collaboration component may be simulated using a test collaboration window and test version of the backend application, the operation including relaying the communication and providing relevant data from the backend application (504). For example, the simulator 206 may be used with the test collaboration window 208 and the test application 112a, including simulating association of relevant data of the test application 112a with the communication (e.g., associating business information about a potential sale with a telephone call in-progress (or imminently in-progress) with the potential purchaser; or associating customer support information such as previous technical problems experienced by the customer when talking to the customer, or bringing up a previous invoice or other business document when talking to a recipient of the invoice/document, such as may occur in SRM system).

Compatibility of the collaboration component with the component manager using the common collaboration interface may be certified (506). For example, the certification manager 210 may be configured to certify that the collaboration component 130 is fully interactive with the collaboration manager 126 via the common collaboration interface 125.

Certification may occur on a channel-specific basis. For example, the certification manager 210 may be capable of certifying four or more channels supported by the common collaboration interface 125, but if a specific collaboration component 130 supports only two of these, then the certification manager 210 may certify only those two as being compatible with the common collaboration interface 125.

The collaboration component may then be provided to the collaboration window (508). For example, the collaboration component 130 may be registered with the registration manager 134 and stored in the memory 136 of FIG. 1, for use by/with the collaboration manager 126 to execute the communication over the telephone channel and to associate relevant business data therewith in association with the appropriate telephone call.

Figure 6:
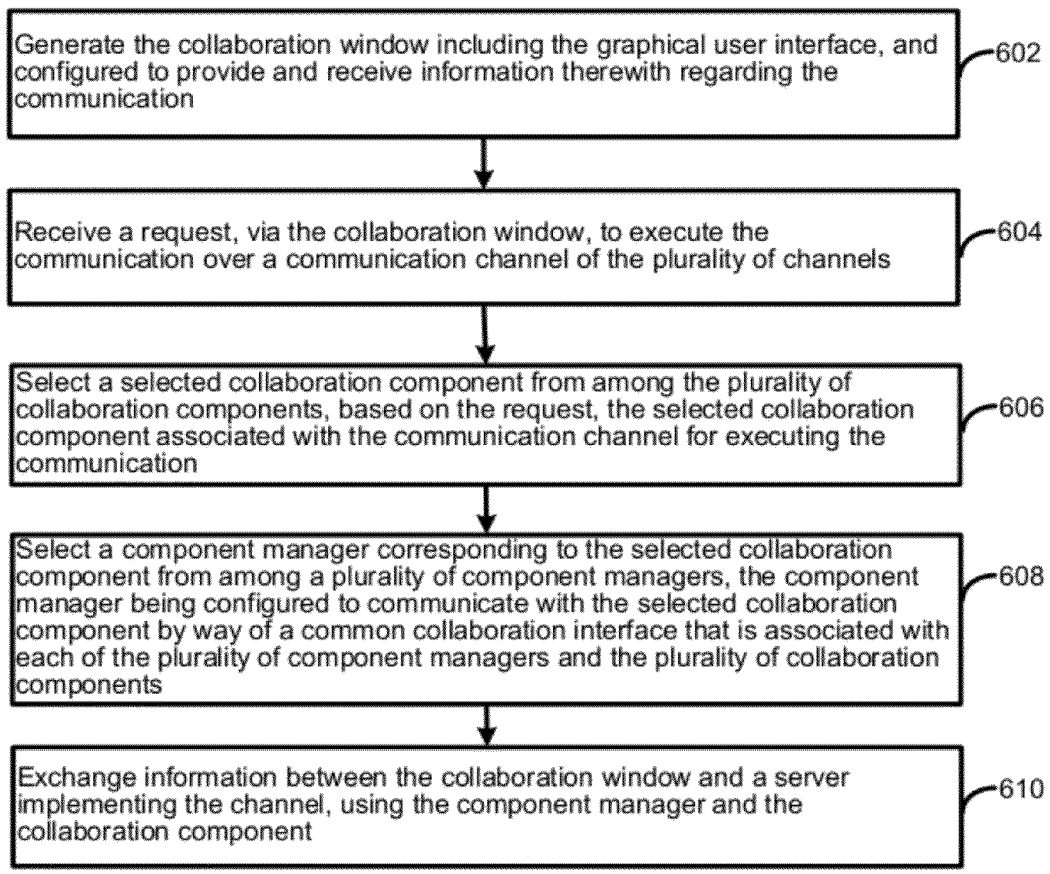
FIG. 6 is a flowchart illustrating second example operations of the system(s) of FIGS. 1 and/or 2.

FIG. 6 is a flowchart 600 illustrating second example operations of the system(s) of FIGS. 1 and/or 2. FIG. 6 also illustrates a method of supplementing the collaboration window, e.g., using the collaboration components generated using the method of FIG. 5. Specifically, the collaboration window may be generated including a graphical user interface, and may be configured to provide and receive information therewith regarding the communication (602). For example, the collaboration window generator 106 may be configured to generate the collaboration window 108 including the appropriate graphical user interface. As shown in the examples of FIGS. 1 and 3, and described herein, the collaboration window 108 may provide interaction techniques for placing, receiving, and conducting telephone calls or other communication items.

A request may be received, via the collaboration window, to execute the communication over a communication channel of the plurality of channels (604). For example, the collaboration engine 124 may receive a request of the user 120 via the appropriate button, icon, or other interface element of the collaboration window 108 to execute a telephone call over the telephone channel.

A selected collaboration component may be selected from among the plurality of collaboration components, based on the request, the selected collaboration component associated with the communication channel for executing the communication (606). For example, the component selector 142 may be configured to select the (telephony) collaboration component 130 for executing a telephone call from among a plurality of collaboration components, each associated with one or more other channels. The selection may be performed based on a current/explicit request of the user 120, or based on preferences of the user 120 as stored in the memory 140

A component manager 144 corresponding to the selected collaboration component may be selected from among a plurality of component managers, the component manager being configured to communicate with the selected collaboration component by way of a common collaboration interface that is associated with each of the plurality of component managers and the plurality of collaboration components (608). For example, the component manager 144 may be selected by the component selector 142 as corresponding to the (telephony) collaboration component 130, i.e., as being configured to implement the common collaboration interface 125 therewith.

Information may then be exchanged between the collaboration window and a server implementing the channel, using the component manager 144 and the collaboration component (610). For example, the component manager 144 may communicate with the collaboration component 130 using the common collaboration interface 125 to interact with the (telephony) server/application 132.

Figure 7:
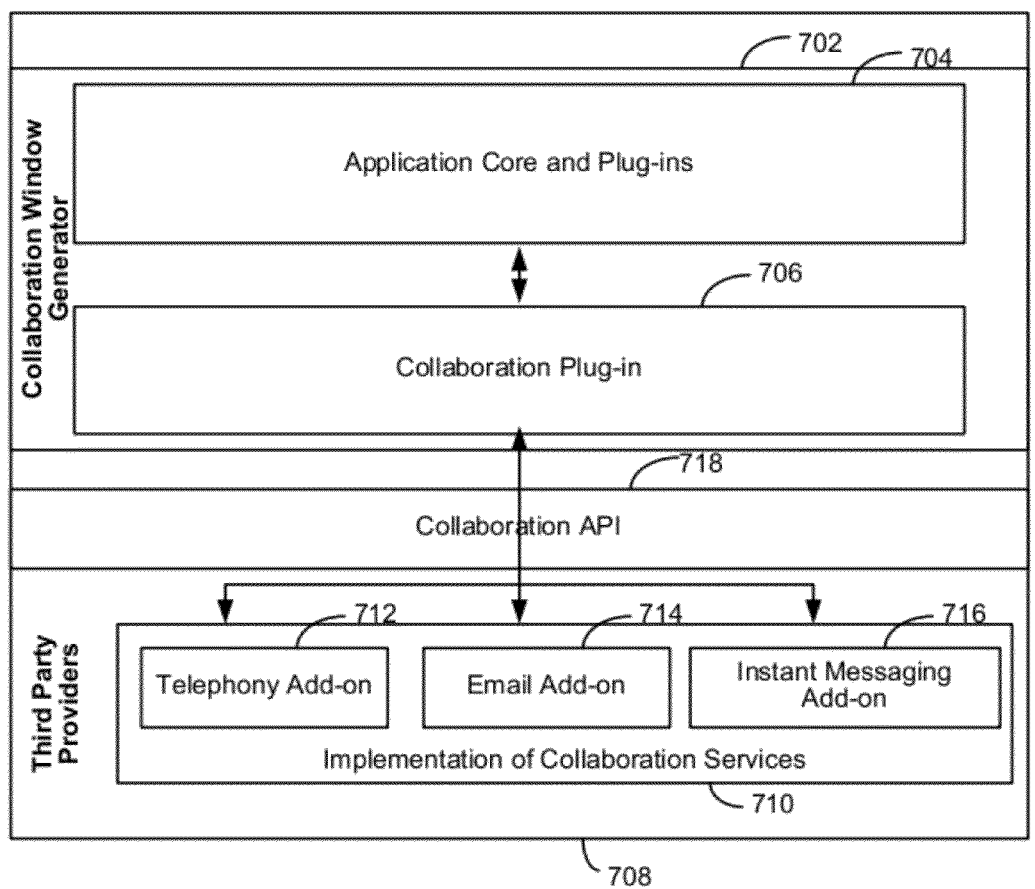
FIG. 7 is a block diagram of an example implementation of the system of FIG. 1.

FIG. 7 is a block diagram 700 of an example implementation of the system of FIG. 1. In FIG. 7, a collaboration window generator 702 analogous to the collaboration window generator 106 may be used to provide both an application core and plug-ins 704 and a collaboration plug-in 706. In this regard, it may be appreciated from the above description that the application core and plug-ins 704 may provide an example of (part of) the collaboration engine 124 in which additional plug-in components may be added, e.g., related to the application 112. The collaboration plug-in 706 may thus represent an example of the collaboration manager 126.

As described herein and illustrated in FIG. 7, $3^{rd}$ party providers 708 may thus provide an implementation of collaboration services 710, as shown. Specifically, such $3^{rd}$ party providers 708 may provide the collaboration component(s) 130 that are shown in FIG. 7 as add-on components. In the example of FIG. 7, these include a telephony add-on 712, an email add-on 714, and an instant messaging add-on 716. Of course, these are just for the sake of example, and more or fewer channels (e.g., a chat channel, or a web conferencing channel) may be provided by one or more other $3^{rd}$ party providers.

As described, the collaboration plug-in 706 may provide an example of the collaboration manager 126. Thus, as shown in FIG. 7, the common collaboration interface 125 may be illustrated as a collaboration API which enables communication between the component manager 144 and the appropriate/corresponding collaboration component 130.

Figure 8:
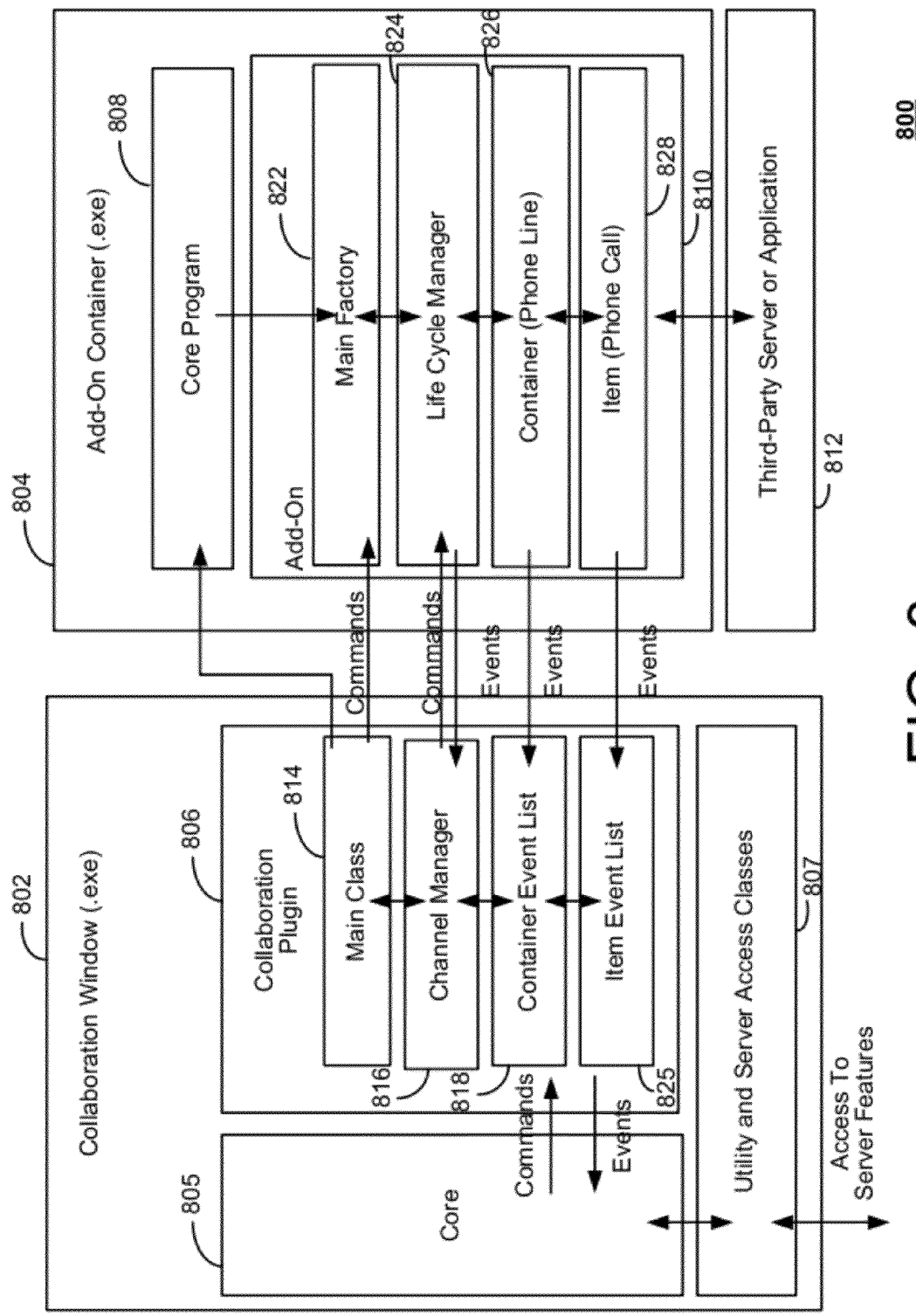
FIG. 8 is a block diagram of a second example implementation of the system of FIG. 1.

FIG. 8 is a block diagram 800 of a second example implementation of the system of FIG. 1. In the example of FIG. 8, an executable of the collaboration window 802 is illustrated as being in communication with an add-on container 804, the latter being an example implementation of the collaboration component container 128 of FIG. 1 in which the collaboration component 130 is implemented as an add-on, similarly to the example of FIG. 7.

In FIG. 8, the collaboration window executable 802 includes a core 805 that may be configured to implement general functions of the collaboration window including providing the associated collaboration window GUI and associated components and interacting with a backend application (e.g., the application 112). In the latter regard, for example, certain utility and server access classes 807 may be used to access server features associated with executing the collaboration window in conjunction with the application 112. A collaboration plug-in 806, analogous to the collaboration plug-in 706 of FIG. 7 and corresponding to an example implementation of the collaboration manager 126, may be configured to communicate with a core program 808 of the add-on container 804 and/or with an add-on 810 that is analogous to the add-on 712 of FIG. 7 and that provides an example of the collaboration component 130.

More specifically, the collaboration plug-in 806 includes a main class 814 that initiates the add-on 810 (using the core program 808), e.g., in response to a selection of the user 120 to initiate/conduct a telephone call using a $3^{rd}$ party server/application 812. The main class 814 also may instantiate a channel manager 816 that is analogous to the component manager 144 of FIG. 1 inasmuch as it manages the add-on 810. A container event listener 818 and associated item event listener 820 relate to events received from the add-on 810 and related to the telephone line and call.

In the add-on 810, a main factory 822 is a factory that receives initial commands from the main class 814 and that then instantiates a lifecycle manager 824 (analogous to the lifecycle manager 146 of FIG. 1). As shown, the add-on 810 may include a container 826, which, it may be appreciated from FIG. 4 and associated discussions herein, the container 826 in the telephony example refers to a specific telephone line of the user 120, while an item 828 refers to a specific phone call on the line (container) in question.

Figure 9:
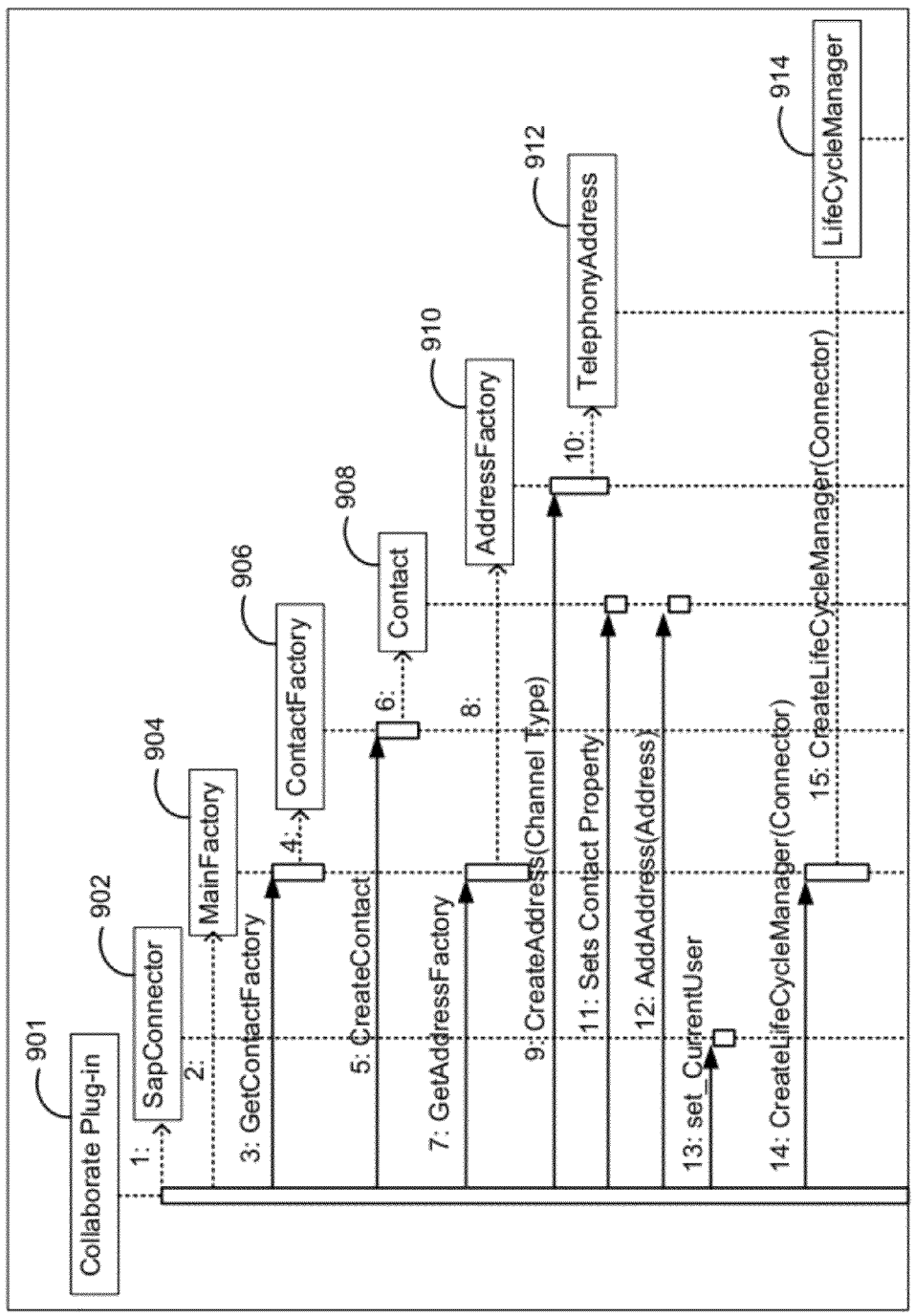
FIG. 9 is a timing diagram for initializing factories in the implementation of FIG. 8.

Operations of the implementation of FIG. 8 are provided in more detail below, with respect to FIGS. 9-13. Specifically, FIG. 9 is a timing diagram (e.g., a sequence diagram in the context of a Unified Modeling Language (UML)) for initializing factories in the implementation of FIG. 8. Although not explicitly illustrated in the example of FIG. 8, it may be appreciated that the implementation of FIG. 8 may include the connector 148 of FIG. 1 in the add-on 810. As referenced, the connector 148 may represent an object from which the add-on is able to access services, information, or application(s) from the backend system 110 that the collaboration window executable 802 provides to the add-on 810. The initialization provides an opportunity for the collaboration window executable 802 to provide the add-on 810 with an instance of the connector 148. Also, before the initialization of the Add-On 810, attributes may be collected/made available, so that the collaboration window executable 802 may take into account the description of the Add-On 810 and suggest it to the user 120, via the preference manager 138.

Thus, in FIG. 9, initialization of the Add-On 810 first includes the collaboration plug-in 901 creating the connector 902 (1) and then instantiating the Main Factory 904 (2), which as described, may be considered to be an entry point for the Add-On 810. Once the Main Factory is initialized, the Collaboration Plug-in 901 requests from it instances of a Contact Factory 906 (3, 4) from which a contact may be created (5) resulting in a contact object 908 (6), e.g., for the current user 120, as described below. From this, the collaboration plug-in 901 may request an address factory (7) from the Main Factory 904, resulting in the address factory 910 being instantiated (8). Similarly to the contact creation, an address (including channel type, e.g., telephony) may be created (9) which results in a telephony address 912 (10). Then, the collaboration plug-in 901 may set a contactID property (11) and add the address (12) with the contact object 908 (the address object may be used to hold the previously-set phone line number of the current user 120)), and set an ID of the current user 120 with the connector 902 (13). Finally in FIG. 9, the life cycle manager may be requested from the main factory 904 (14), resulting in instantiation of the life cycle manager 914 (15).

Thus, in FIG. 9, the Address Factory 910 may be used to prepare the representation of the current user 120 that will be accessible via a property CurrentUser of the Connector, and which provides the detailed information of the current user of the Collaboration Window. Some typical uses of such details are, for instance, to initialize the telephony feature with the telephony addresses (phone numbers) defined for the user. For example, the Add-On 180 may register itself to a telephony server on the phone number defined for the current user, or may connect to the telephony server with the ID of the contact (user).

In FIGS. 8 and 9, the Main Factory may be considered a factory of factories. The real controller object of the Add-On 810 is the Life Cycle Manager. Once the various factories are created and used to prepare the Contact for the user 120 so that the Add-On consumes it, the Collaboration Plug-in 806/901 may instantiate the Life Cycle Manager 824/914, which may then control the life cycle of an Add-On and its channel(s), and is therefore responsible for, for example, starting and stopping the Add-On and the channel(s) that is (are) supported by the Add-On; providing access to the channels; and notifying any creation or deletion of channels to the Collaboration Plug-in so that it can react on them. For example, a typical scenario may be that the Add-On (via its Life Cycle Manager) notifies the Collaboration Plug-in that a telephony channel has been created, so that subsequently any telephony features of the Collaboration Window may be enabled.

Figure 10:
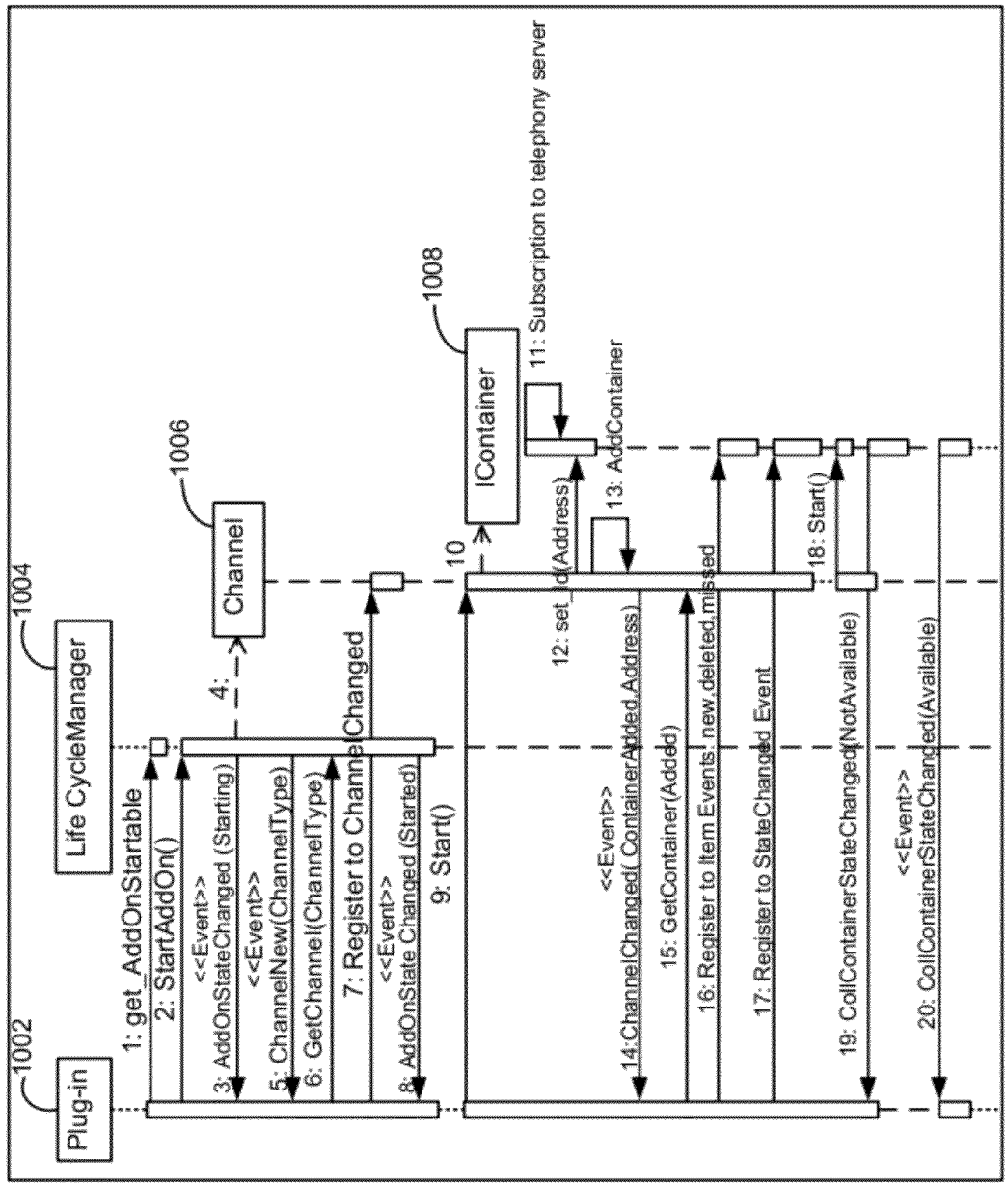
FIG. 10 is a timing diagram for starting a collaboration component in the implementation of FIG. 8.

FIG. 10 is a timing diagram (which also may be referred to as a sequence diagram) for starting a collaboration component (e.g., the add-on 810) in the implementation of FIG. 8. In FIG. 10, the collaboration plug-in 1002 starts the Add-On 810 if the Add-On 810 declares itself as 'Startable,' e.g., via its property AddOnStartable (1) within the Life Cycle Manager 1004. Thus, the Add-On gets started when the Collaboration Plug-in invokes the method StartAddOn( ) (2), which triggers the creation of the 'functional' objects, channels and container(s). For example, the life cycle manager 1004, as shown, may notify the collaboration plug-in 1002 that its state is changed (e.g., to starting) (3), along with messages regarding a new channel (5) and channel type (6) for a channel object 1006. The collaboration plug-in 1002 may then register to the channel (7) and receive notification from the life cycle manager 1004 that the state has been changed to started (8).

At that point in time those objects are only instantiated. They may be started later in the overall starting sequence (once the method Start( ) of the IChannel is invoked) (9). In general, though, it may be appreciated from FIG. 10 and the above description that the creations of channels and containers raise events to inform the Collaboration Plug-in 1002. The purpose of these notifications is to make the Collaboration Window aware of the overall operational state of a channel, which thus informs as to whether the channel is usable or not.

Thus, as just referenced, the Collaboration Window may monitor an Add-On via its state contained in the property AddOnState. At the end of a successful initialization of an Add-On, as already referenced, the Life Cycle Manager is created, initialized and started (AddOnState is set to Starting). Once startup is successfully finished, the Add-On state becomes "Started" (if unsuccessful for any reason, the Add-On state becomes "Failed" which indicates that it can't be used in the current situation). The Channel 1006 is created, initialized and started for each supported ChannelType. These channels are accessible via the Life Cycle Manager (with the method GetChannel (ChannelType), as shown and described).

Then, the Container(s) 1008 are created, initialized and started (9). The container 1008 may expose its availability via states. The usability of a channel is derived from the usability of each of its containers. If at least one of the containers is available, then the Collaboration Plug-in 1002 will consider that the channel is available and ready for serving the relevant features. As a consequence, if none of the containers are available, the channel will simply be ignored and the feature will not be accessible in the application.

All state changes of an Add-On, a channel or a container may be associated with an appropriate event of the relevant runtime environment. This may include, for example, changes on the container-list of a channel. It may be designated as the responsibility of the Add-On to raise these events as soon as a change happens. The Collaboration Plug-in reacts on these events. If they are not raised then features (like giving a call) may not be accessible in the Collaboration Window even if the Add-On is started successfully and ready. On the other hand, if the Add-On objects do not notify for any reason, for example when a feature is not available anymore (due, for example, to network loss or software failure), then the Collaboration Window may still attempt to use the Ad-On and may therefore lead to an erroneous situation in the complete application.

In FIG. 10, methods on the container 1008 may not be defined in the common collaboration interface 125, e.g., method (9)-(14) or (16)-(20). Such methods may be useful to structure the implementation of an Add-On, although the Collaboration objects may never use them.

After the start of the container 1008 (9, 10), the set of the container property Id with an address retrieved from the IContact enables the container 1008 to initialize itself against the server (e.g., telephony server 812 of FIG. 8). This results in setting the address (12) and adding the container 1008 to the channel 1006 (13).

Then, the channel 106 may inform the collaboration plug-in 1002 that the channel is changed/added with the relevant address and container type (14). The collaboration plug-in 1002 may then get the container address (15), and register to events from the container (e.g., new, deleted or missed events) (16) and to state change events (17).

Finally in FIG. 10, the channel may allow starting of the container (18) whereupon the container 1008 may inform the collaboration plug-in 1002 that it has experienced a state change (19) (e.g., to not available) or available (20).

Figure 11:
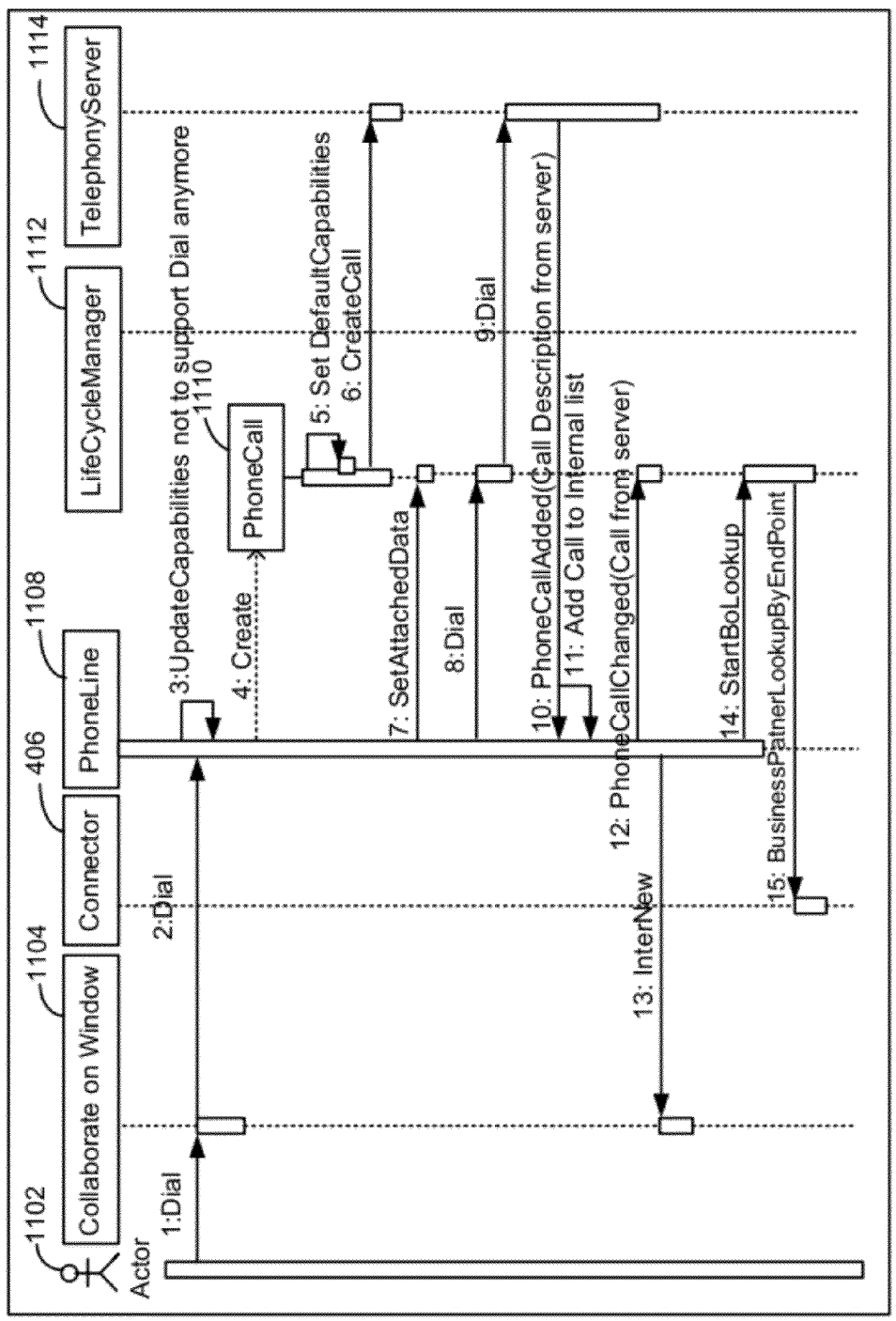
FIG. 11 is a timing diagram for initiating an outbound telephone call in the implementation of FIG. 8.

FIG. 11 is a timing diagram for initiating an outbound telephone call by an actor 1102 in the implementation of FIG. 8. For example, an outbound call may be triggered by the end user 1102 using a Call Control UI (or other appropriate part of the Collaboration Window) or clicking on a phone number rendered as a link in the Collaboration Window (1104).

The Collaboration Plug-in invokes the Dial( ) method (1, 2) defined on Phone Line 1108 to initiate the PhoneCall. Since both the Phone Line and the Phone Call are facades of the real objects located in the telephony server, they will get prepared to get the real information coming from the server. In order to call a phone number, the Phone Line 1108 instantiates an Phone Call that will represent the future phone call, and then updates its capabilities so that "can dial" is not listed anymore so that a phone call 1110 is created (3, 4). The phone call 1110 may set default capabilities (5) and communicate with the telephone server 1114 to create the call (6).

Since the Collaboration Window can attempt to embed in the outbound call some data in order to enrich the context of the call processing (from the business process point of view), the phone line attaches these data to the phone call 1110 (7). If supported by the Telephony server, these data should be propagated to the callee collaboration window for further processing.

Hence, the phone line 1108, the phone call 1110, and the telephony server 1114 should be ready for issuing the outbound call. This can be triggered as shown by a Dial request on the phone call which triggers the dialing on the Telephony server (8, 9). The method (9) may be expected to provide at least an ID for the phone call. This ID will be then propagated to the Phone Call 1110 and the Phone Line 1108 to uniquely identify the item.

As soon as the outbound call is 'dialing', the server 1114 notifies the Phone Line of this (10) and especially updates it with the identifier of the phone call. In reaction to this, the phone line 1108 adds the call to an internal list (11), notifies the phone call of the message from the server (12), and notifies the collaboration plug-in 1104 that a new collaboration item has been added on the phone line (13), i.e., a Phone Call in state "Ringing." The collaboration Plug-in may then register to the item events in order to follow its changes (e.g., dropped, or accepted . . . ).

As soon as the notification of the call creation is received, the phone line triggers a lookup to identify relevant data, e.g., the Business partner being called via this call (14). This lookup may be executed against the application 112 of FIG. 1 and will return using the connector 1106, if any, a contact (or a list of contacts) representing, e.g., Business Partners that have been registered with the phone number that has been used for the outbound phone call. According to the evolution of the phone call on the telephony network (PSTN or VoIP network) the call maintained by the Telephony Server will then change his state and notify the Phone Call 1110 which will finally notifies the plug-in of any changes.

Figure 12:
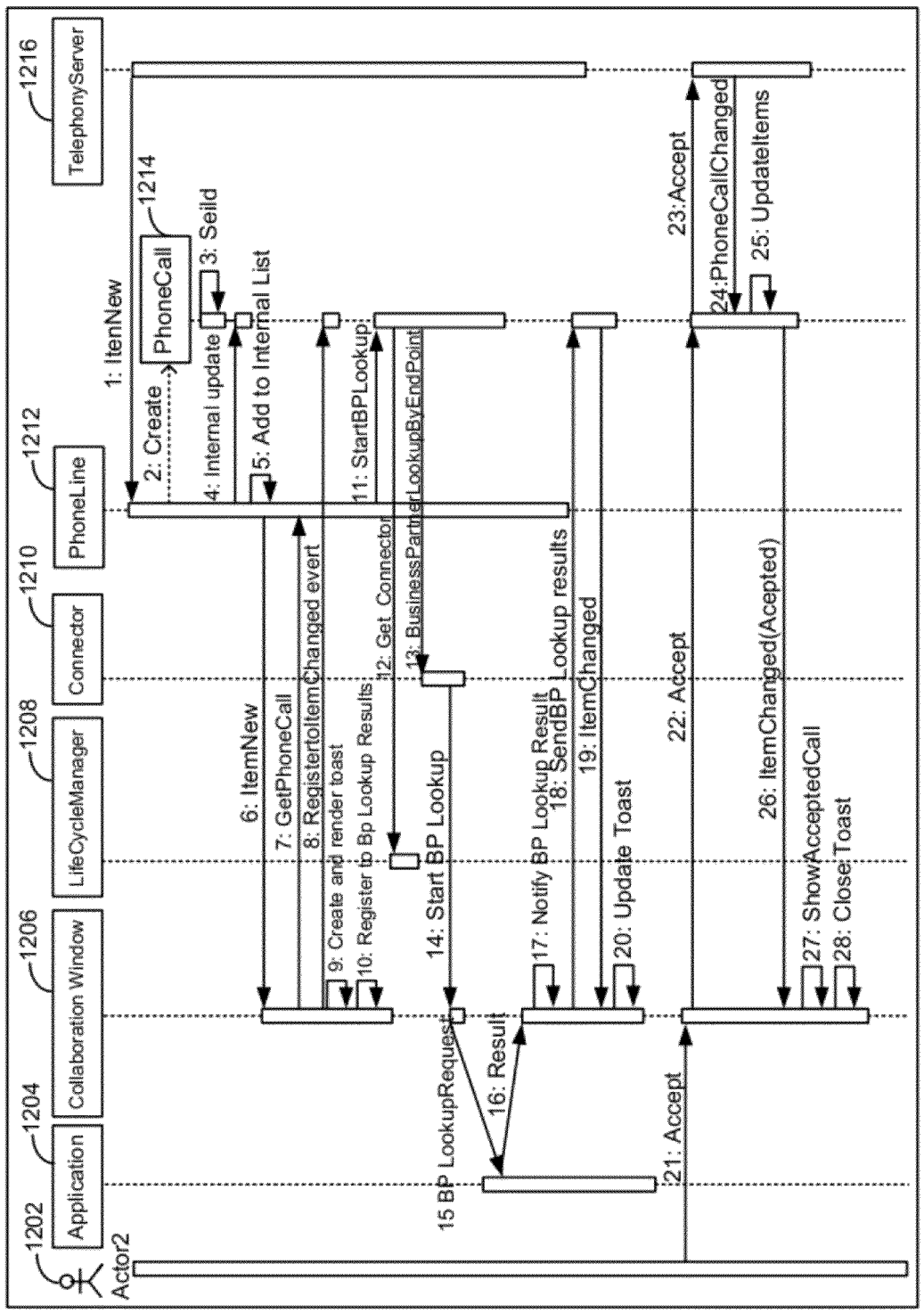
FIG. 12 is a timing diagram for receiving an inbound telephone call in the implementation of FIG. 8.

FIG. 12 is a timing diagram for receiving an inbound telephone call in the implementation of FIG. 8. An inbound scenario starts with a notification to the Add-On from the telephone server 1216 (1). In the case of an inbound call, the Telephony server 1216 may notify the Phone Line 1212 of a new item, a phone call. That phone call already has an ID as that identifier is allocated by the Telephony Server. It is also marked as inbound (property IsInbound set to true) and its state is Alerting which is the first state of an inbound call.

Describing methods 2 to 5, in order to be able to control the incoming phone call, the phone line 1212 creates a Phone Call 1214 and updates it with the characteristics notified by the Telephony Server. This Phone Call 1214 is then the representation of the real inbound phone call. The phone line 1212 stores it internally in the list of calls that it manages.

At this step, the phone line is ready to handle any update from the telephony server on the phone call but still has to make the Collaboration Plug-in aware of the new phone call. This is done raising an event ItemNew to the collaboration Plug-in in the collaboration window 1206. As soon as it is notified that a new phone call occurred (6, 7, 8) the collaboration plug-in registers to events related to this phone call in order to closely follow its life cycle.

The Collaboration Window then creates and shows a toasting popup to the end user to inform him of the new call and enable him to accept or reject the call via this toast (9). The toast is first rendered with the call information that the Telephony Server provided: mainly the phone number (or telephony address) is available.

The Collaboration Window also registers itself to the result of Business Partner Lookup (10). The BP Lookup may be initiated by the phone line in order to identify as much as possible the caller. The BP Lookup is a service offered by the Collaboration Window to the Add-Ons via the Connector 148. In order to initiate a lookup, the Add-On retrieves the Connector from its Life Cycle Manager and invokes the method BusinessPartnerLookupByEndPoint (steps 11 to 14). This is triggered by the phone line 1212 as soon as it has added the phone call to the list of its items. The phone call is then invoked to start the lookup for business partner since it has to update itself, e.g, its remote address, according to the result of this lookup, in order to define the Contact of the remote address. Thus, in methods 15 to 20, the BP lookup request may be sent to the application 1204 to obtain a result which is then provided in the collaboration window 1206 and sent to/with the phone call 1214, which notifies the collaboration window 1204 of the change to the item and updates the toast in the collaboration window 1204.

If the end user decides to take the incoming call by a clicking on the accept button of the toast (21), then the Collaboration Window triggers the Accept method of the phone call (22) which 'pilots' the Telephony Server to accept the real phone call (23) and notify the phone call 1214 of the acceptance (24) and update the item accordingly (25). The change of the item (Phone Call) is then notified to the collaboration window 1206 (26), so that it may show acceptance of the call (27) and close the toast (28).

Figure 13:
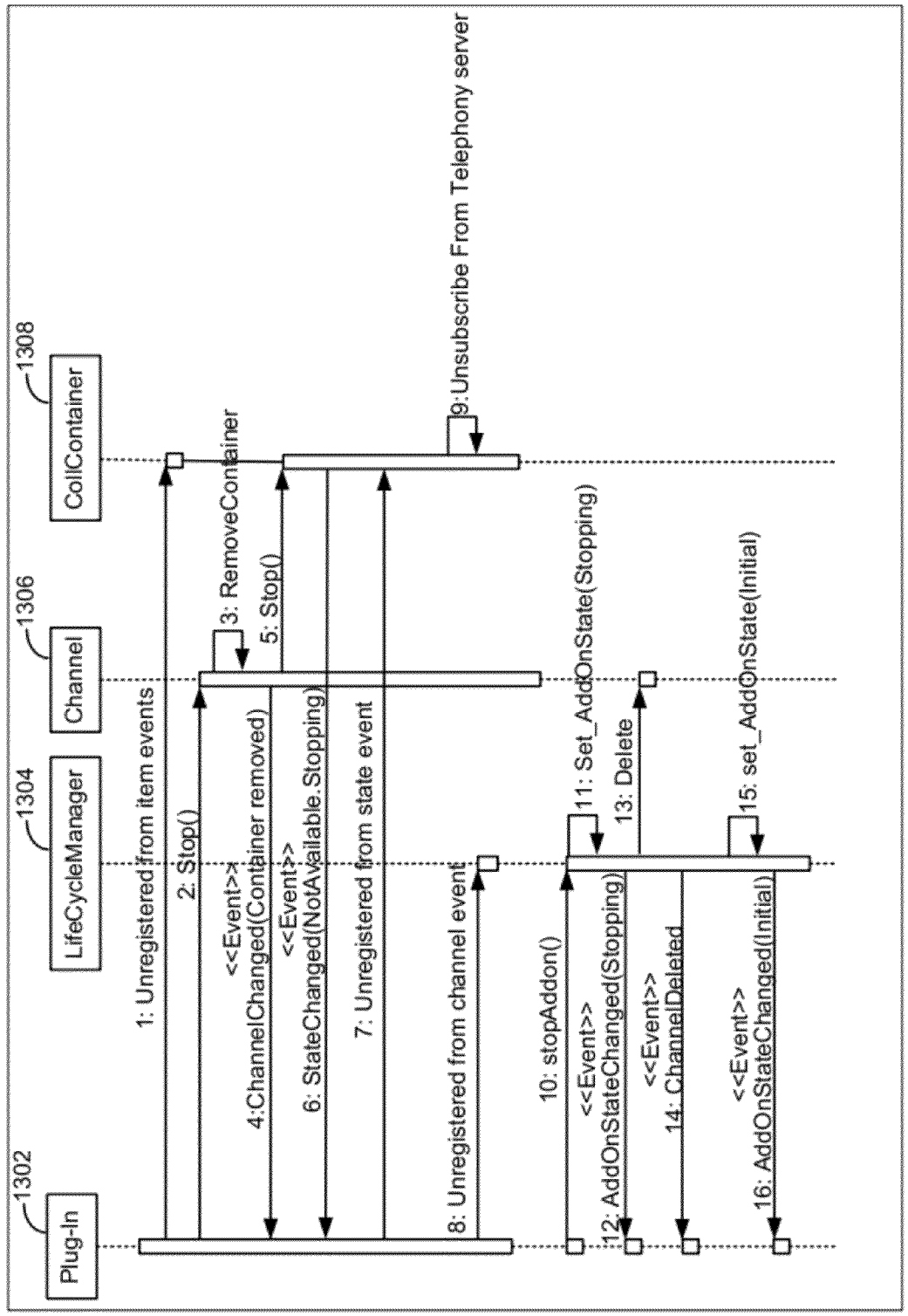
FIG. 13 is a timing diagram for stopping a collaboration component in the implementation of FIG. 8.

FIG. 13 is a timing diagram for stopping a collaboration component (e.g., the add-on 810) in the implementation of FIG. 8. Generally, the stop of an Add-On may be triggered when the user of the Collaboration Window logs off or otherwise exits the application. Stop of the add-on is thus a cleaning step of the life cycle of an Add-On where the channels, containers and items must be properly ended and cleaned.

This process is triggered by a message from the collaboration plug-in 1302 to the container 1308 that the plug-in will unregister from item events (1), followed by the method Stop( ) on the channel (1306) (2), after the un-registration from any item events related to the containers of the given channel. The channel should remove the containers it owns (3) and trigger their ending and cleaning, e.g., by notifying the collaboration plug-in 1302 that the channel is changed and/or container removed (4) and sending a stop message to the container 1308 (5). Any change of state should be notified with the relevant event (6). The cleaning of the containers should trigger the cleaning of any remaining items 'contained' in these containers. The collaboration plug-in 1302 may unregister from state events of the container 1308 (7) and from channel events of the life cycle manger 1304, whereupon the container 1308 may unsubscribe from the telephone server 812.

Once the containers are cleaned, the channel should stop itself (10) including setting the add-on state to stopping (11) in the life cycle manager 1304 and sending a corresponding event to the collaboration plug-in 1302 (12), to thereby allow deletion of the channel (14). The overall cleaning process thus finishes with the cleaning of the Add-On itself which notifies its state changes as just described, and including setting the add-on state back to initial (15) and notifying the collaboration plug-in of this (16). At this point, the Collaboration Plug-in may unload the Add-On in order to complete the step.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system configured to provide a collaboration window providing a graphical user interface to a user for facilitating communication over at least one of a plurality of communication channels while providing data relevant to the communication and available from a backend application, the computer system comprising:

a collaboration engine comprising instructions stored in a memory, the instructions configured to, when executed by a processor, generate the collaboration window including the graphical user interface, and configured to provide and receive information therewith regarding the communication;

a collaboration manager comprising instructions stored in the memory, the instructions configured to, when executed by the processor, communicate, in accordance with a common collaboration interface, with each of a plurality of collaboration components, each collaboration component associated with at least one communication channel, the collaboration manager including:

a component selector configured to select a selected collaboration component from among the plurality of collaboration components, the selected collaboration component associated with a communication channel for executing the communication;

a plurality of component managers, each associated with a corresponding one of the plurality of collaboration components and configured to communicate, using the common collaboration interface, with its corresponding collaboration component and with a connector of the corresponding collaboration component that is compatible with the backend application in order to receive the data relevant to the communication from the backend application, wherein a selected component manager corresponding to the selected collaboration component is configured to relay information between the selected collaboration component and the collaboration engine to thereby execute the communication using the collaboration window; and a registration manager that is configured to register each of the plurality of collaboration components with the collaboration manager as being compatible with the common collaboration interface, the registering including associating each registered collaboration component with a corresponding component manager.

2. The system of claim 1 wherein the plurality of collaboration components are selected from among available collaboration components based at least in part on compatibility thereof with the common collaboration interface.

3. The system of claim 1 wherein the collaboration manager comprises a preference manager that is configured to assist the component selector in selecting the selected component by providing a preference of the user in this regard.

4. The system of claim 1 wherein the component selector is configured to select the selected component based on a user choice received via the collaboration window.

5. The system of claim 1 wherein the plurality of communication channels include at least two of a telephone line, a videoconference line, an email application, a chat application, or an instant messaging application.

6. The system of claim 1 wherein the component manager is configured to communicate with a lifecycle manager of the collaboration component to manage a status of the collaboration component.

7. The system of claim 1 wherein the component manager is configured to initiate communication with the connector to receive the data relevant to the communication from the backend application in response to initiation of a communication using its corresponding collaboration component.

8. A computer program product for enabling a collaboration window providing a graphical user interface to a user for facilitating communication over at least one of a plurality of communication channels while providing data relevant to the communication and available from a backend application, the computer program product being tangibly embodied on a computer-readable storage device and including executable code that, when executed, is configured to operate at least one data processing apparatus in accordance therewith, wherein the computer program product includes:

a collaboration component developed based on a reference implementation provided by a vendor of the backend application and configured to implement a common collaboration interface with a component manager associated with the collaboration window, to thereby implement at least one of the plurality of communication channels by relaying the communication between the component manager and a server implementing the channel, the collaboration component including a lifecycle manager configured to receive commands from the component manager using the common collaboration interface and to configure a state of the collaboration component based thereon, a connector configured to communicate with the backend application using the common collaboration interface and to provide the data therefrom that is relevant to the communication in conjunction with the communication, a channel manager configured to exchange the communication with the component manager using the common collaboration interface, and configured to exchange the communication with the server implementing the channel; and a simulator configured to execute a test version of the backend application for use in testing the connector and thereby the interoperation of the collaboration component with the common collaboration interface.

9. The computer program product of claim 8, comprising a certification manager configured to certify compatibility of the collaboration component with the common collaboration interface and thereby with the component manager.

10. The computer program product of claim 8, wherein the backend application is independently executing business software.

11. A method of supplementing a collaboration window providing a graphical user interface to a user for facilitating communication over at least one of a plurality of communication channels while providing data relevant to the communication and available from a backend application, the method comprising:

developing, based on a reference collaboration component, a collaboration component configured to implement a common collaboration interface with a collaboration manager associated with the collaboration window, to thereby implement at least one of the plurality of communication channels by relaying the communication between the collaboration manager and a server implementing the channel;

simulating operation of the collaboration component using a test collaboration window and test version of the backend application, the operation including relaying the communication and providing the relevant data from the backend application;

certifying compatibility of the collaboration component with the component manager using the common collaboration interface; and providing the collaboration component to the collaboration window by registering the collaboration component with a registration manager associated with the collaboration window.

12. The method of claim 11 wherein the developing the collaboration component comprises developing the collaboration component using a development environment that is common to an operational environment in which the collaboration window will execute.

13. The method of claim 11 wherein the plurality of communication channels includes a telephone channel.

14. A method of supplementing a collaboration window providing a graphical user interface to a user for facilitating communication over at least one of a plurality of communication channels while providing data relevant to the communication and available from a backend application, the method comprising:

generating the collaboration window including the graphical user interface, and configured to provide and receive information therewith regarding the communication;

receiving a request, via the collaboration window, to execute the communication over a communication channel of the plurality of channels;

selecting a selected collaboration component from among the plurality of collaboration components, based on the request, the selected collaboration component associated with the communication channel for executing the communication;

selecting a component manager corresponding to the selected collaboration component from among a plurality of component managers, the component manager being configured to communicate with the selected collaboration component by way of a common collaboration interface that is associated with each of the plurality of component managers and the plurality of collaboration components;

exchanging information between the component manager and a connector of the selected collaboration component, the connector being compatible with the backend application in order to provide the data relevant to the communication; and exchanging information between the collaboration window and a server implementing the communication channel, using the component manager, the common collaboration interface, and the collaboration component by:

analyzing at least a portion of the information;

accessing the backend application using the connector to obtain the data relevant to the communication, based on the analyzing;

and supplementing the information with the data relevant to the communication.

15. The method of claim 14 wherein selecting the selected collaboration component includes selecting the selected collaboration component from among a plurality of registered collaboration components that are registered with the collaboration manager as being compatible with the common collaboration interface.

16. The method of claim 14 wherein selecting the selected collaboration component comprises selecting the selected collaboration component based on a user preference stored with respect to the user.

* * * * *